United States Patent
Porterfield

[11] Patent Number: 6,141,715
[45] Date of Patent: *Oct. 31, 2000

[54] METHOD AND SYSTEM FOR AVOIDING LIVE LOCK CONDITIONS ON A COMPUTER BUS BY INSURING THAT THE FIRST RETIRED BUS MASTER IS THE FIRST TO RESUBMIT ITS RETRIED TRANSACTION

[75] Inventor: A. Kent Porterfield, New Brighton, Minn.

[73] Assignee: Micron Technology, Inc., Boise, Id.

[*] Notice: This patent issued on a continued prosecution application filed under 37 CFR 1.53(d), and is subject to the twenty year patent term provisions of 35 U.S.C. 154(a)(2).

[21] Appl. No.: 08/826,548

[22] Filed: Apr. 3, 1997

[51] Int. Cl.$^7$ ...................................................... G06F 13/36
[52] U.S. Cl. .......................... 710/113; 710/108; 710/110; 710/116; 710/120; 710/244; 710/126; 710/129; 710/856; 711/150; 711/151; 711/146; 711/167
[58] Field of Search ...................................... 395/287–305, 395/728–732, 856–865; 711/150–151, 146, 167; 710/107–125, 210–244, 36–45, 126–129

[56] References Cited

U.S. PATENT DOCUMENTS

| | | | |
|---|---|---|---|
| 5,151,900 | 9/1992 | Snyder et al. | 370/400 |
| 5,175,733 | 12/1992 | Nugent | 370/400 |
| 5,355,496 | 10/1994 | Fant et al. | 395/706 |
| 5,369,745 | 11/1994 | Faber | 395/200.7 |
| 5,404,536 | 4/1995 | Ramakrishnan et al. | 395/727 |
| 5,418,914 | 5/1995 | Heil et al. | 395/293 |
| 5,444,701 | 8/1995 | Cypher et al. | 370/406 |
| 5,467,295 | 11/1995 | Young et al. | 395/200.4 |
| 5,471,590 | 11/1995 | Melo et al. | 395/288 |
| 5,471,601 | 11/1995 | Gonzalez | 711/3 |
| 5,524,235 | 6/1996 | Larson et al. | 711/151 |
| 5,535,395 | 7/1996 | Tipley et al. | 395/729 |
| 5,546,546 | 8/1996 | Bell et al. | 395/292 |
| 5,594,875 | 1/1997 | Thaller | 395/287 |
| 5,634,037 | 5/1997 | Sasaki et al. | 711/152 |
| 5,706,446 | 1/1998 | Kalish et al. | 395/293 |
| 5,717,876 | 2/1998 | Robertson | 395/309 |
| 5,761,446 | 6/1998 | Donley et al. | 395/287 |
| 5,761,454 | 6/1998 | Adusumilli et al. | 710/126 |
| 5,933,612 | 8/1999 | Kelly et al. | 710/126 |
| 5,996,036 | 11/1999 | Kelly | 710/110 |

*Primary Examiner*—Ayaz R. Sheikh
*Assistant Examiner*—Rupal D. Dharia
*Attorney, Agent, or Firm*—Dorsey & Whitney LLP

[57] ABSTRACT

A computer system avoids livelock conditions on a computer bus coupled to plural bus masters. In response to receiving a transaction request from a first bus master across the computer bus, a bus controller transmits a retry command to the first bus master if the bus controller is unable to execute the transaction request. A livelock condition is avoided by preventing transaction requests from any of the bus masters, other than the first bus master, from being processed until after the first bus master re-submits the transaction request. The bus controller may prevent execution of the transaction request from the other bus masters by transmitting retry commands to all bus masters that submit transaction requests after the transaction request from the first bus master is received and before the first bus master re-submits the transaction request. Alternatively, the bus controller may prevent the other bus masters from successfully arbitrating access to the computer bus until after the first bus master uses the computer bus to re-submit its transaction request.

28 Claims, 6 Drawing Sheets

METHOD AND SYSTEM FOR AVOIDING LIVE LOCK CONDITIONS ON A COMPUTER BUS BY INSURING THAT THE FIRST RETIRED BUS MASTER IS THE FIRST TO RESUBMIT ITS RETRIED TRANSACTION

TECHNICAL FIELD

The present invention relates to processing transactions across a computer bus, and more particularly, to avoiding a livelock condition on the computer bus.

BACKGROUND OF THE INVENTION

A computer system includes a set of interconnected components or modules of three basic types: central processing unit (CPU), data and instruction storage, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The process of allocating time or bandwidth on a computer bus among plural bus masters (i.e., modules driving the computer bus) is known as arbitration. Typically, an arbiter grants access for a predetermined time period or bandwidth window to whichever bus master first transaction requests use of the bus. If plural bus masters have requests for use of the bus pending, then the arbiter employs an arbitration scheme, such as a rotational priority scheme, to share the bus among the bus masters. In a rotational priority scheme, the use of the bus is given for one time period or window to each bus master in sequential order.

In a typical computer system, an expansion bus, such as a Peripheral Component Interconnect (PCI) bus, is coupled by a PCI-host bridge to a processor bus connected to the central processing unit. The bus masters coupled to the PCI bus transmit transaction requests across the PCI bus and the PCI-host bridge to a system memory module via the PCI-host bridge. In many instances, the bus masters issue so many transaction requests to the PCI-host bridge via the PCI bus that the PCI bus becomes saturated. In addition, the resources of the PCI-host bridge may be insufficient to handle the large number of transaction requests being received via the PCI bus. For example, a write buffer in the PCI-host bridge may be full, and thus, unenable to handle another write transaction. If the PCI-host bridge is too busy to process one of the transaction requests, then the PCI-host bridge issues a retry command to the bus master that transmitted the transaction request. The retry command instructs the bus master to re-submit the transaction request because the originally submitted transaction request could not be processed.

Given that the PCI bus is saturated with transaction requests, one of the bus masters may be on the receiving end of such retry commands more than the other bus masters. In particular, the transaction requests may be such that one of the bus masters receives several consecutive retry commands for a single transaction request. This is known as a livelock condition in that transaction requests are continuously being transmitted on the PCI bus, but one of the bus masters is unable to send or receive data.

A simple example of a livelock condition is illustrated in FIG. 1. Bus masters 1 and 4 are requesting read transactions, and bus masters 2 and 3 are requesting write transactions. At the time of the first read transaction request from bus master 1, the write buffer in the PCI-host bridge is empty. The ordering rules for PCI busses require that the write buffer be empty for a read transaction request to be executed, and thus the first read transaction request from bus master 1 is processed normally as indicated by the read transfer status block. The write transaction requests from bus masters 2 and 3 are processed next, which causes the write buffer to go to a "not empty" state. When the PCI-host bridge receives the read transaction request from bus master 4, the PCI-host bridge notices that the write buffer is not empty, and thus the PCI-host bridge is not ready to process the read transaction request. In response, the PCI-host bridge issues a retry command to the bus master 4 via the PCI bus and empties the write buffer.

In response to receiving the retry command from the PCI-host bridge, the bus master 4 arbitrates for access to the PCI bus so that the read transaction request from the bus master 4 can be re-submitted. However, before bus master 4 can gain access to the PCI bus again, bus masters 1, 2, and 3 submit their second transaction requests across the PCI bus to the PCI-host bridge. The transaction requests from the bus masters 2 and 3 are write transaction requests, so the write buffer re-enters the "not empty" state. As a result, the re-submitted read transaction request from bus master 4 cannot be processed, so the PCI-host bridge again issues a retry command to bus master 4 and the sequence begins again. Thus, bus master 4 repeatedly arbitrates for and gains access to the PCI bus, but because of the transaction traffic from the other bus masters, bus master 4 is not in a position to actually complete a transaction, and thus, is in a livelock condition. At some point, the PCI bus traffic likely would change enough to allow bus master 4 to complete its read transaction, but the livelock condition may continue for many milliseconds, which is enough time for latency sensitive devices to generate an error condition.

SUMMARY OF THE INVENTION

One embodiment of the present invention is directed toward a computer system and method for avoiding a livelock condition on a computer bus coupled to a plurality of bus masters. In response to receiving a transaction request from a first bus master across the computer bus, a bus controller transmits a retry command to the first bus master if the bus controller is unable to execute the transaction request. A livelock condition is avoided by preventing transaction requests from any of the bus masters, other than the first bus master, from being processed until after the first bus master re-submits the transaction request. One embodiment for preventing transaction requests from other than the first bus master includes transmitting retry commands to all bus masters that submit transaction requests for access to the target device after the first transaction request is received and before the re-submitted first transaction request is received. In an alternate embodiment, the bus masters other than the first bus master are prevented from successfully arbitrating access to the computer bus until after the first bus master uses the computer bus to re-submit the first transaction request.

DETAILED DESCRIPTION OF THE INVENTION

Figure 2:
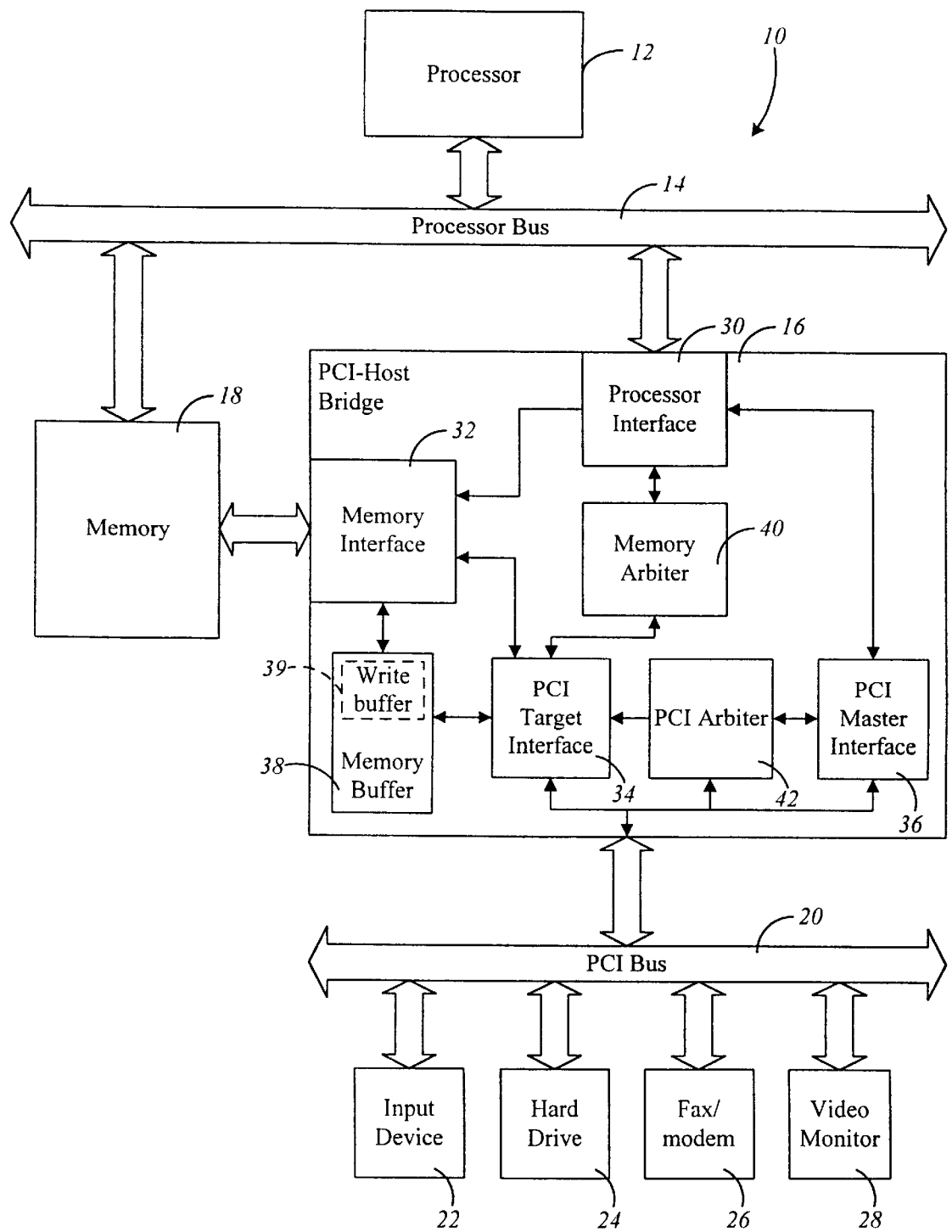
FIG. 2 is a block diagram of a computer system that avoids livelock conditions according to the present invention.

FIG. 2 is a computer system 10 that avoids livelock conditions according to an embodiment of the present invention. The computer system 10 includes a processor 12 coupled by a processor bus 14 to a PCI-host bridge 16. The processor 12 can include any microprocessor, such as the Pentium Pro™ microprocessor from Intel Corp. The computer system 10 also includes system memory 18 generally comprised of dynamic random access memory (DRAM), which stores software instructions and data that is used by the processor 12 to perform a specified function. The software instructions include application programs and an operating system, such as Microsoft Windows NT, that interfaces the application programs with the hardware of the computer system 10. The system memory 18 includes a data bus that is coupled to the processor bus 14 to allow the processor 12 to write data to and read data from the system memory 18. The control and addressing of the system memory 18 are accomplished by control and address signals provided to the system memory 18 by the PCI-host bridge 16 through respective control and address buses.

The PCI-host bridge 16 is coupled by an expansion bus 20, such as a Peripheral Component Interconnect (PCI) bus, to a plurality of PCI computer devices, such as an input device 22, a hard drive 24, a fax/modem 26 and a video monitor 28. It will be appreciated that expansion buses other than PCI buses and other computer devices coupled to the expansion buses may be used. The input device 22 can include any of numerous known input devices, such as a keyboard, mouse, and electronic pen and tablet. When the PCI computer devices 22–28 coupled to the PCI bus 20 request data to be written to or read from the memory 18, the PCI computer devices are acting as bus masters and the PCI-host bridge 16 is a bus target. When the processor 12 attempts to read data from or write data to any of the PCI computer devices 22–28 via the PCI-host bridge 16, then the PCI-host bridge 16 acts as a PCI bus master and the PCI computer devices 22–28 act as PCI bus targets.

The PCI-host bridge 16 provides an interface between the processor 12, memory 18, and the PCI bus 20. The PCI-host bridge 16 includes a processor interface 30 that controls how data is received from or sent to the processor 12 via the processor bus 14. The PCI-host bridge 16 also includes a memory interface 32 that controls how data is written to and read from the memory 18. The control and address signals needed for the processor 12 to write data to the memory 18 or read data from the memory 18 are coupled to the memory 18 via the process interface 30 and the memory interface 32 while the data is passed between the processor 12 and the memory 18 via the processor bus 14 without using the PCI-host bridge 16. It will be appreciated that other memory configurations are possible, such as removing the direct connection between the processor bus 14 to the memory 18 to allow the data to be transmitted via the PCI-host bridge 16.

To communicate with the PCI bus 20, the PCI-host bridge 16 includes a PCI target interface 34 and a PCI master interface 36. The PCI target interface 34 is employed when data is being written to or read from the memory 18 during a transaction originating in one of the PCI computer devices 22–28 coupled to the PCI bus 20. The PCI master interface 36 controls data being written to or read from one of the PCI computer devices 22–28 coupled to the PCI bus 20 during a transaction originating in the processor 12. The PCI-host bridge 16 also includes a memory buffer 38 that temporarily stores data being transmitted to and from the memory 18 via the memory interface 32. The memory buffer 38 includes a write buffer 39 that stores write transaction requests received from the PCI target interface 34.

The PCI-host bridge 16 also includes a memory arbiter 40 that arbitrates between transaction requests to the memory 18 from the processor 12 via the processor interface 30 and from the PCI bus 20 via the PCI target interface 34. The memory arbiter 40 decides which of the transaction requests from the processor interface 30 and the PCI target interface 34 will be sent first to the memory 18 via the memory interface 32. Although any arbitration scheme can be employed, typically a high-priority write transaction request receives priority over a read transaction request which receives priority over a low priority write transaction request. A high-priority write transaction request occurs when the write buffer 39 is full, with all other write transaction requests being low-priority write transaction requests. If two transaction requests are of the same type, then typically the transaction requests received from the processor interface 30 will have priority over transaction requests received from the PCI target interface 34.

The PCI-host bridge 16 includes a PCI arbiter 42 that provides arbitration of transactions on the PCI bus 28 that originate from the PCI master interface 36 or any of the PCI computer devices 22–28 coupled to the PCI bus 20. Each of the PCI computer devices 22–28 may have a dedicated arbitration request line and a dedicated arbitration grant line directly coupled to the PCI arbiter 42. For any one of the PCI computer devices 22–28 to transmit a transaction request across the PCI bus 20 to the PCI-host bridge, the PCI computer device first requests, via its dedicated arbitration request line, the PCI arbiter 42 to grant the PCI computer device access to the PCI bus 20. The PCI arbiter 42 grants access to the PCI bus 20 by transmitting a grant signal across the grant line of the PCI computer device being granted access. The PCI arbiter 42 is coupled to the PCI target interface 34 and provides the PCI target interface 34 with an identifier signal that identifies which of the PCI computer devices is being granted access to the PCI bus 20. The PCI target interface 34 can use the identifier signals received from the PCI arbiter 42 to selectively allow or prevent processing of transaction requests in order to prevent livelock conditions from occurring on the PCI bus 20.

In contrast to prior art computer systems, the computer system 10 avoids livelock conditions on the PCI bus 20 by preventing any transaction requests from any of the bus masters (i.e., PCI computer devices 22–28), other than a first bus master, from being processed until a re-submitted transaction request from the first bus master is processed in the event the transaction request could not be processed the first time it was submitted by the first bus master. For example, if the PCI target interface 34 issues a retry command in response to receiving a transaction request from the input device 22, then the PCI target device 34 prevents any transaction requests from the hard drive 24, fax/modem 26, and video monitor 28 from being processed until after the transaction request is re-submitted by the input device 22 and received by the PCI target interface 34. In one embodiment, the PCI target interface 34 prevents such transaction requests from the hard drive 24, fax/modem 26, and video monitor 28 by issuing them retry commands until the re-submitted transaction request of the input device 22 is received by the PCI target interface 34. In another embodiment, the PCI target interface 34 prevents such transaction requests from the hard drive 24, fax/modem 26, and video monitor 28 from being processed by causing the PCI arbiter 42 to deny access to the PCI bus 20 by the computer devices 24–28 until the re-submitted transaction request by the input device 22 is received by the PCI target interface 34. As a result, the PCI target interface 34 prevents the occurrence of livelock conditions caused by repeated retry commands being transmitted to any one of the computer devices 22–28.

Figure 1:
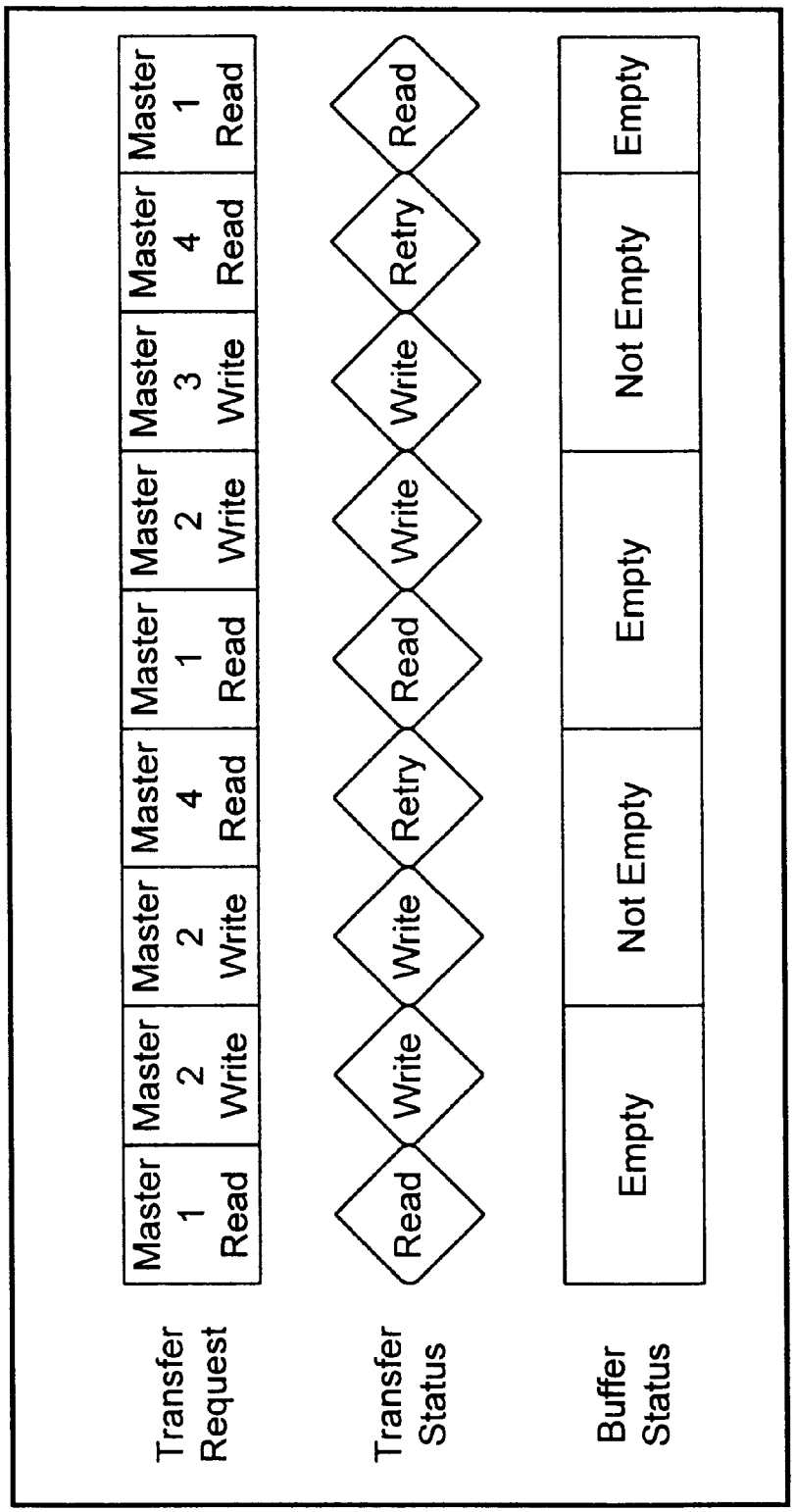
FIG. 1 is a state diagram illustrating a livelock condition according to the prior art.
Figure 3:
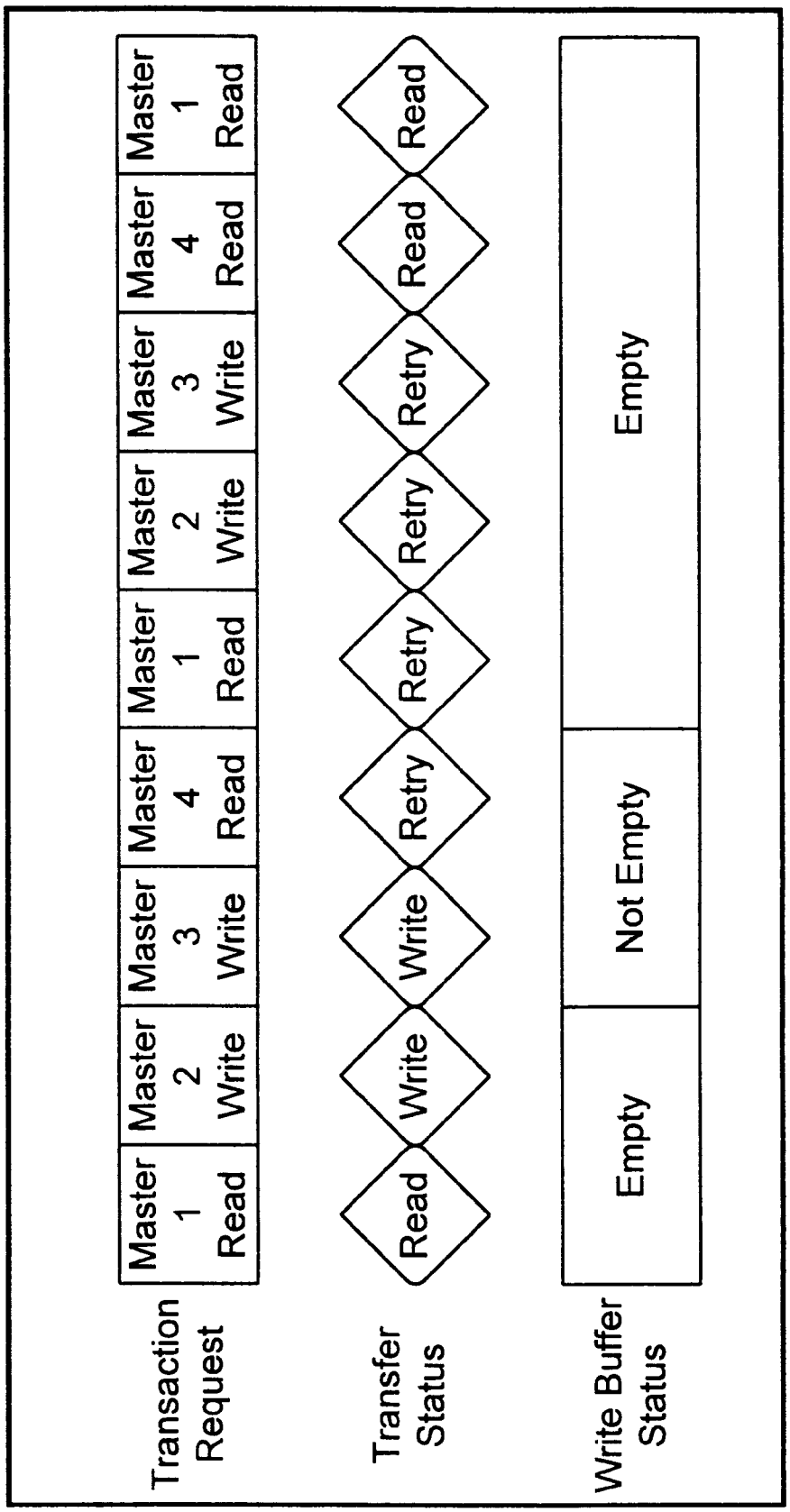
FIG. 3 is a state diagram illustrating a first method for avoiding a livelock condition according to the present invention.

An example of preventing a livelock condition according to the first embodiment of the invention is shown in FIG. 3. As in the example shown in FIG. 1, bus masters 1 and 4, such as the input device 22 and the video monitor 28, request read transactions and bus masters 2 and 3, such as the hard drive 24 and the fax/modem 26, request write transactions. The read transaction request from bus master 1 and the write transaction requests from bus masters 2 and 3 are processed normally and result in the write buffer 39 having a "not empty" status. As a result, in response to receiving the read transaction request from bus master 4, the PCI target interface 34 issues a retry command to the bus master 4 and empties the write buffer 39. As used herein, "emptying the write buffer" refers to writing the data from the write buffer 39 to the memory 18. In addition, and in contrast to prior art systems, the PCI target interface 34 stores an ineligible flag for each of the bus masters 1–3 to indicate that bus masters 1–3 are ineligible to have their next transaction requests processed until the read transaction request from bus master 4 is re-submitted and received by the PCI target interface 34. Thus, the second read transaction request from bus master 1 and the second write transactions from bus masters 2 and 3 are responded to by the PCI target interface 34 with retry commands. As such, when bus master 4 re-submits the read transaction request, the write buffer is empty and the read transaction request can be processed normally. After the PCI target interface 34 processes the read transaction request re-submitted by bus master 4, the PCI target interface 34 removes the ineligible flags from the bus masters 1–3 to indicate that the bus master 1–3 can have their next transaction requests processed. Bus master 1 re-submits its second read transaction request and the PCI target interface processes it normally because the write buffer is still empty and the bus master 1 no longer has an ineligible flag associated with it.

Figure 4:
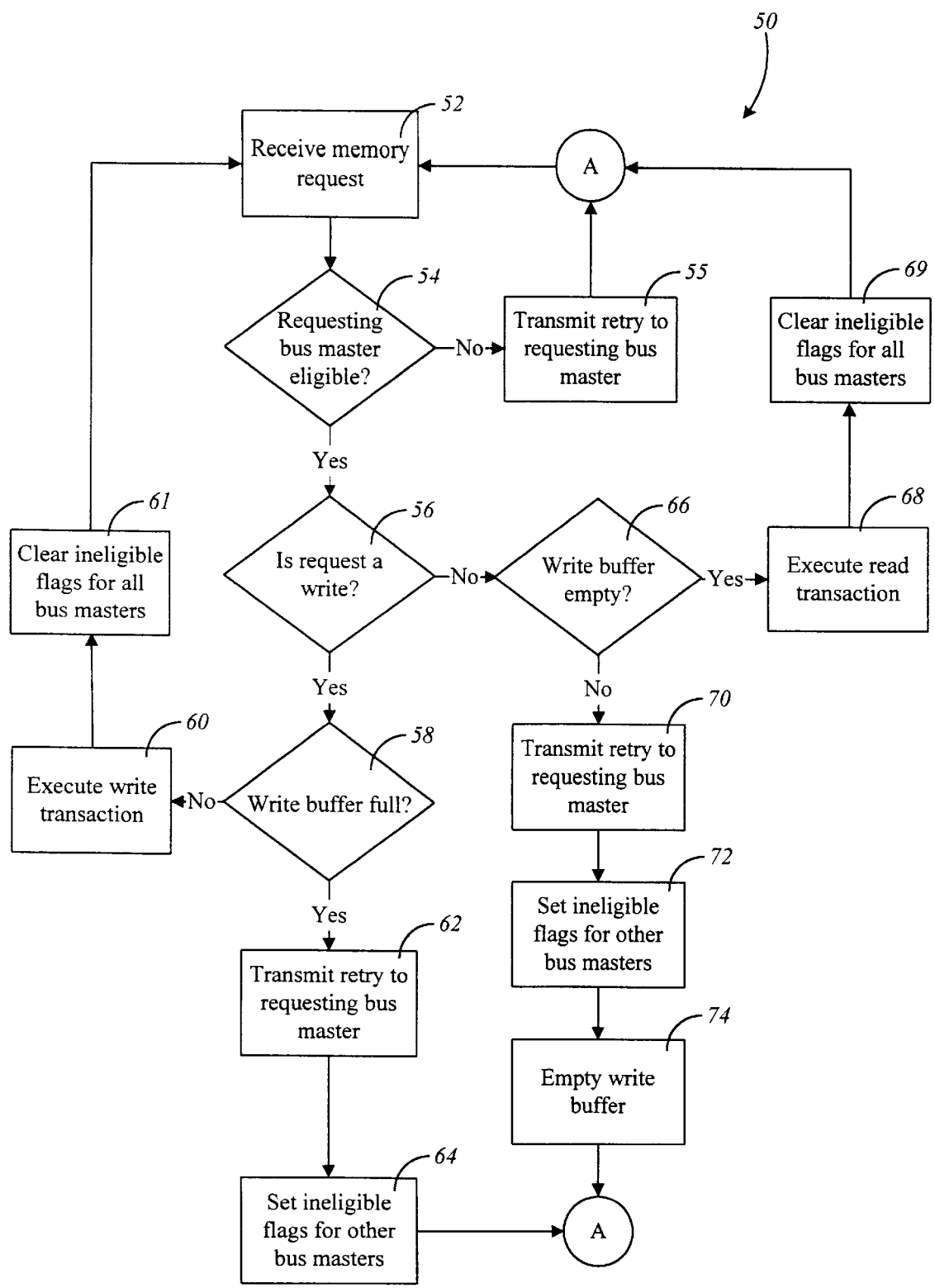
FIG. 4 is a flow diagram of the first method for avoiding livelock conditions according to the present invention.

Shown in FIG. 4 is a flow diagram of a first method 50 for avoiding livelock conditions on the PCI bus 20. In step 52, the PCI target interface 34 receives a memory request from one of the bus masters 22–28. In step 54, the PCI target interface 34 determines whether an ineligible flag has been set for the bus master that transmitted the transaction request received in step 52. The PCI target interface 34 knows which of the bus masters transmitted the transaction request because the PCI arbiter 42 transmits to the PCI target interface 34 the identifier signal that identifies which bus master was most recently granted access to the PCI bus 20. As discussed above, the PCI target interface 34 would have set an ineligible flag for the bus master submitting the current transaction request if the current transaction request is being submitted after a retry command was transmitted to one of the other bus masters and before that bus master re-submitted its transaction request. If the ineligible flag for the requesting bus master has been set, then in step 55 the PCI target interface transmits a retry command to the requesting bus master and returns to step 52 to receive the next memory request.

If the ineligible flag has not been set for the bus master that submitted the current memory request received in step 52, then in step 56 the PCI target interface 34 determines whether the current transaction request is a write transaction request. As is well known, part of each transaction request is a control signal that indicates whether the transaction request is a read or a write. If the current transaction request is a write transaction request, then in step 58 the PCI target interface 34 determines whether the write buffer 39 is full. If the write buffer 39 is not full, then in step 60 the write transaction request is executed normally by storing in the write buffer 39 the data to be written in the memory 18 and requesting the memory arbiter 38 to allow the transaction request to proceed. When the PCI target interface 34 gains access to the memory interface 32 via the memory arbiter 38, then the memory interface 32 writes the data in the memory 18 and transmits an acknowledgment back to the bus master via the PCI target interface 34 and the PCI bus 20. In step 61, the ineligible flags for all bus masters are cleared and the method returns to step 52 to receive the next memory request.

If the PCI target interface 34 determines in step 58 that the write buffer 39 is fall, then in step 62 the PCI target interface 34 transmits a retry command to the bus master that submitted the current transaction request. Transmitting the retry command gives the memory interface 32 time to free some space in the write buffer 39 by writing the data from one or more write transaction requests to the memory 18. In step 64, the PCI target interface 34 sets the ineligible flags for the bus masters other than the bus master that transmitted the current transaction request and returns to step 52 to receive the next memory request.

If the PCI target interface 34 determines in step 56 that the current transaction request is not a write transaction request, then in step 66 the PCI target interface 34 determines whether the write buffer 39 is empty. As discussed above, PCI ordering rules require the write buffer to be empty to process a read transaction request. If the write buffer 39 is empty, then in step 68 the current read transaction request is executed normally. In step 69, the ineligible flags for all bus masters are cleared and the method returns to step 52 to receive the next memory request.

If the PCI target interface 34 determines in step 66 that the write buffer is not empty, then in step 70 the PCI target interface 34 transmits a retry command to the bus master that submitted the current transaction request. In step 72, the PCI target interface 34 sets the ineligible flags for the bus masters other than the bus master that transmitted the current transaction request. In step 74, the PCI target interface 34 causes the write buffer 39 to be flushed by causing the memory interface 32 to write in the memory unit 16 the data currently stored in the write buffer 40.

Figure 5:
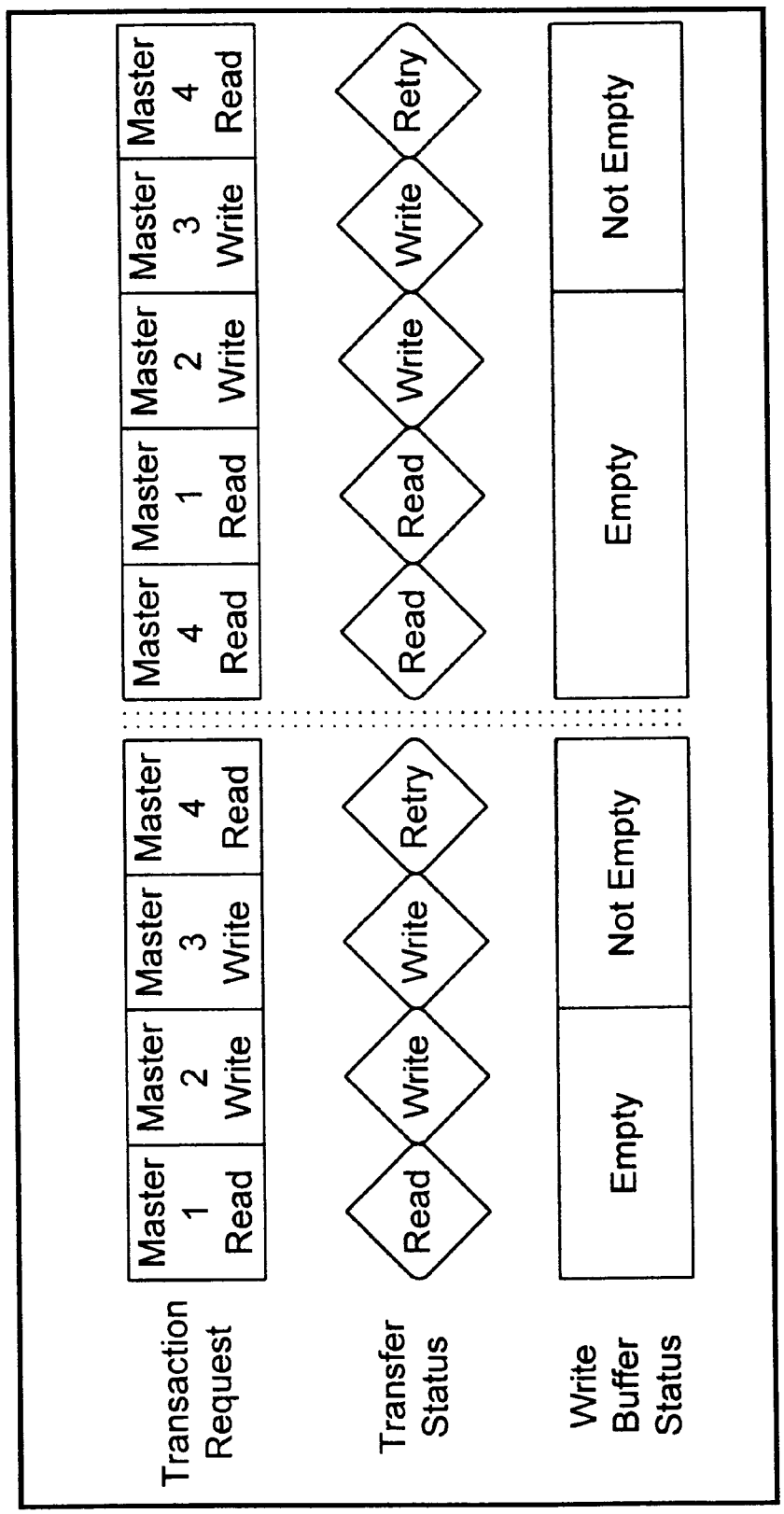
FIG. 5 is state diagram illustrating a second method for avoiding a livelock condition according to the present invention.

An example of preventing a livelock condition according to a second embodiment of the invention is shown in FIG. 5. As in the examples shown in FIGS. 1 and 3, bus masters 1 and 4 request read transactions and bus masters 2 and 3 request write transactions. The read transaction request from bus master 1 and the write transaction requests from bus masters 2 and 3 are processed normally and result in the write buffer 39 having a "not empty" status. As a result, in response to receiving the read transaction request from bus master 4, the PCI target interface 34 issues a retry command to the bus master 4 and empties the write buffer 39. In addition, and in contrast to prior art systems, the PCI target interface 34 transmits to the PCI arbiter 42 a signal indicating that bus masters 1–3 are ineligible to have their next arbitration requests granted. In response, the PCI arbiter 42 stores, for each of bus masters 1–3, an ineligible flag that indicates that the bus masters shall not be granted access to the PCI bus 20. Thus, when bus masters 1–3 transmit arbitration requests for access to the PCI bus 20, the PCI arbiter 42 responds by denying them such access. None of the bus masters are granted access to the bridge until bus master 4 transmits to the bus arbiter 42 an arbitration request for access to the PCI bus 20 in order to re-submit its read transaction request. After the PCI target interface 34 processes the read transaction request re-submitted by bus master 4, the PCI target interface 34 transmits to the PCI arbiter 42 a signal indicating that the PCI arbiter 42 should remove the ineligible flag from the bus masters 1–3 to indicate that the bus masters 1–3 can have their next arbitration requests granted. Bus masters 1–3 re-submit their arbitration requests and second transaction requests in sequence and the transaction requests are processed normally.

Figure 6:
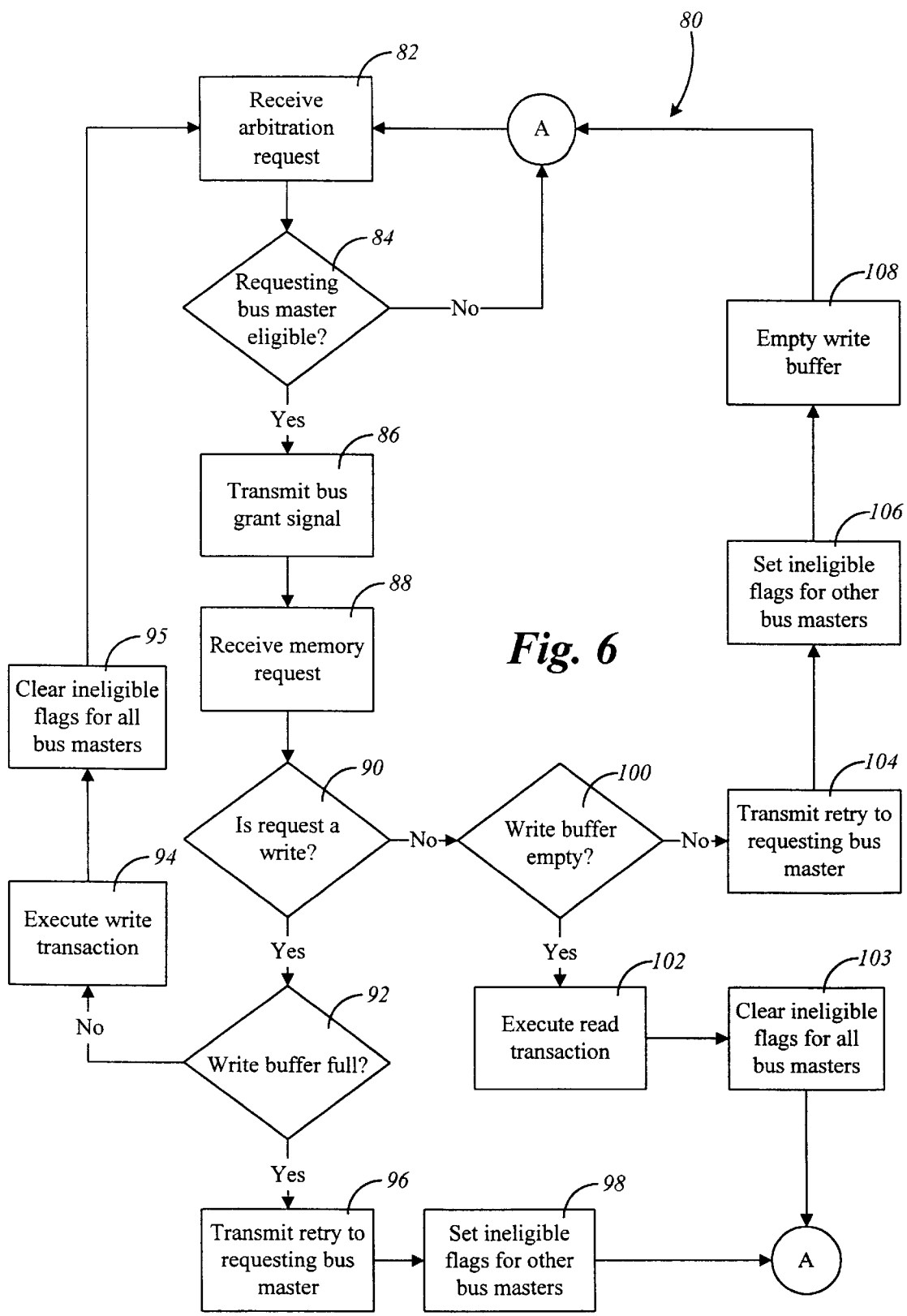
FIG. 6 is a flow diagram of the second method for avoiding livelock conditions according to the present invention.

Shown in FIG. 6 is a flow diagram of a second method 80 for avoiding livelock conditions on the PCI bus 20. In step 82, the PCI arbiter 42 receives an arbitration request from one of the bus masters 22–28. In step 84, the PCI arbiter 42 determines whether the requesting bus master is eligible to be granted access to the PCI bus 20. As discussed above, the PCI arbiter 42 would have set an ineligible flag for the requesting bus master if the current arbitration request is being submitted after a retry command was transmitted to one of the other bus masters and before the other one of the bus masters re-submitted its transaction request. If the ineligible flag for the requesting bus master has been set, then the PCI arbiter 42 simply returns to step 82 to receive the next arbitration request without granting the requesting bus master access to the PCI bus 20.

If the ineligible flag has not been set for the requesting bus master, then in step 86 the PCI arbiter 42 transmits a bus grant signal to the requesting bus master which enables the requesting bus master to access the PCI bus 20. In step 88, the PCI target interface 34 receives a memory request from the requesting bus master. In step 90, the PCI target interface 34 determines whether the current transaction request is a write transaction request. If the current transaction request is a write transaction request, then in step 92 the PCI target interface 34 determines whether the write buffer 39 is full. If the write buffer 39 is not full, then in step 94 the write transaction request is executed normally. In step 95, the ineligible flags for all bus masters are cleared and the method returns to step 82 to receive the next arbitration request.

If the PCI target interface 34 determines in step 92 that the write buffer 39 is full, then in step 96 the PCI target interface 34 transmits a retry command to the bus master that submitted the current transaction request. In step 98, the PCI target interface causes the PCI arbiter 42 to set the ineligible flags for the bus masters other than the requesting bus master and returns to step 82 to receive the next arbitration request.

If the PCI target interface 34 determines in step 90 that the current transaction request is not a write transaction request, then in step 100 the PCI target interface 34 determines whether the write buffer 39 is empty. If the write buffer 39 is empty, then in step 102 the current read transaction request is executed normally. In step 103, the ineligible flags for all bus masters are cleared and the method returns to step 82 to receive the next arbitration request.

If the PCI target interface 34 determines in step 100 that the write buffer is not empty, then in step 104 the PCI target interface transmits a retry command to the bus master that submitted the current transaction request. In step 106, the PCI target interface 34 causes the PCI arbiter 42 to set the ineligible flags for the bus masters other than the bus master that transmitted the current transaction request. In step 108, the PCI target interface 34 causes the write buffer 39 to be emptied and the method returns to step 82 to receive the next arbitration request.

Based on the foregoing discussion, it will be appreciated that the present invention avoids livelock conditions on a computer bus. As such, latency-sensitive computer devices are made more reliable than in prior art systems that allow such computer devices to be subjected to livelock conditions. The invention can be employed regardless of the arbitration scheme used for the computer bus and regardless of the identity of the computer devices requesting use of the computer bus.

It should be understood that even though numerous advantages of the present invention have been set forth in the foregoing description, the above disclosure is illustrative only. Changes may be made in detail and yet remain within the broad principles of the present invention.

What is claimed is:

1. A computer-implemented method of avoiding a livelock condition on a computer expansion bus coupled to a plurality of bus masters, the method comprising:
   receiving from a first bus master via the computer expansion bus a first transaction request for access to a target device;
   determining whether a path from the first bus master to the target device is available for executing the first transaction request;
   if the path is not available, then:
      transmitting on the computer expansion bus to the first bus master a retry command that causes the first bus master to re-submit the first transaction request for access to the target device;
      storing a retry indicator that indicates that the plurality of bus masters other than the first bus master should receive retry commands if any requests for access to the target device are received after the first transaction request is received and before the resubmitted first transaction request is received; and
      preventing any new transaction requests for access to the target device from being executed until the first transaction request re-submitted by the first bus master is received; and
   removing the retry indicator after the re-submitted first transaction request is received, thereby enabling transaction requests from the plurality of bus masters to be executed.

2. The method of claim 1 wherein the preventing step includes transmitting retry commands to all bus masters that submit transaction requests for access to the target device after the first transaction request is received and before the re-submitted first transaction request is received.

3. The method of claim 1 wherein the preventing step includes preventing the plurality of bus masters, other than the first bus master, from successfully arbitrating access to the computer expansion bus.

4. The method of claim 1 wherein the target device is a memory and the receiving, determining, transmitting, and preventing steps are performed by the computer bus controller.

5. The method of claim 4 wherein the computer bus controller includes a write buffer as part of the path to the memory and the first transaction request is a write transaction request, the determining step including determining whether the write buffer is full, thereby determining that the path is not available for executing the write transaction request if the write buffer is full.

6. The method of claim 4 wherein the computer bus controller includes a write buffer as part of the path to the memory and the first transaction request is a read transaction request, the determining step including determining whether the write buffer is empty, thereby determining that the path is not available for executing the read transaction request if the write buffer is not empty.

7. A computer-implemented method of avoiding a livelock condition on a computer expansion bus coupled to a plurality of bus masters, the method comprising:

receiving from a first bus master via the computer expansion bus a first transaction request for access to a target device;

determining whether a path from the first bus master to the target device is available for executing the first transaction request;

if the path is not available, then:
storing an arbitration indicator that indicates that the plurality of bus masters other than the first bus master should not be granted access to the computer expansion bus, wherein the computer expansion bus is associated with an arbiter that controls access to the computer expansion bus by the plurality of bus masters, including the first bus master, according to a first arbitration scheme;

transmitting to the arbiter an indication that the retry command is being transmitted to the first bus master, the indication causing the arbiter to switch to a second arbitration scheme in which the plurality of bus masters, other than the first bus master, are prevented from successfully arbitrating access to the computer expansion bus until after the first bus master uses the computer expansion bus to re-submit the first transaction request; and removing the arbitration indicator after the re-submitted first transaction request is received, thereby enabling access to the computer expansion bus by the plurality of bus masters.

8. A method of avoiding a livelock condition on a computer bus coupled to a plurality of bus masters and to a bus controller, the method comprising:

receiving at the bus controller from a first bus master via the computer bus a first transaction request for access to a memory device coupled to the bus controller;

transmitting on the computer bus to the first bus master a retry command that causes the first bus master to re-submit the first transaction request to the bus controller for access to the memory device;

storing a retry indicator that indicates that the plurality of bus masters other than the first bus master should receive retry commands if any requests for access to the target device are received after the first transaction request is received and before the re-submitted first transaction request is received;

preventing any new transaction requests for access to the memory device from being executed until the first transaction request re-submitted by the first bus master is received; and removing the retry indicator after the re-submitted first transaction request is received, thereby enabling transaction requests from the plurality of bus masters to be executed.

9. The method of claim 8 wherein the preventing step includes transmitting retry commands to all bus masters that submit transaction requests for access to the target device after the first transaction request is received and before the re-submitted first transaction request is received.

10. The method of claim 8 wherein the preventing step includes preventing the plurality of bus masters, other than the first bus master, from successfully arbitrating access to the computer bus.

11. The method of claim 8 wherein the bus controller includes a write buffer that temporarily stores write transaction requests and the first transaction request is a write transaction request, the method further comprising:

determining whether the write buffer is full and performing the preventing step for the write transaction request if the write buffer is full; and if the write buffer is not full, executing the write transaction request without performing the preventing step for the write transaction request.

12. The method of claim 8 wherein the bus controller includes a write buffer that temporarily stores write transaction requests and the first transaction request is a read transaction request, the method further comprising:

determining whether the write buffer is empty and performing the preventing step for the read transaction request if the write buffer is not empty; and if the write buffer is empty, executing the read transaction request without performing the preventing step for the read transaction request.

13. A method of avoiding a livelock condition on a computer bus coupled to a plurality of bus masters and to a bus controller, the method comprising:

receiving at the bus controller from a first bus master via the computer bus a first transaction request for access to a memory device coupled to the bus controller, the bus controller including a bus arbiter that controls access to the computer bus by the plurality of bus masters, including the first bus master, according to a first arbitration scheme;

transmitting to the bus arbiter an indication that the retry command is being transmitted to the first bus master, the indication causing the arbiter to switch to a second arbitration scheme in which the plurality of bus masters, other than the first bus master, are preventing from successfully arbitrating access to the computer bus until after the first bus master uses the computer bus to re-submit the first transaction request;

storing an arbitration indicator that indicates that the plurality of bus masters other than the first bus master should not be granted access to the computer bus;

preventing any new transaction requests for access to the memory device from being executed until the first transaction request re-submitted by the first bus master is received; and removing the arbitration indicator after the re-submitted first transaction request is received, thereby enabling access to the computer bus by the plurality of bus masters.

14. A computer system having a processor that avoids a livelock condition, the computer system comprising:

a processor bus coupled to the processor;

a computer bus;

a plurality of bus masters coupled to the computer bus, each of the bus masters including a bus interface that transmits transaction requests on the computer bus;

a target device that receives and executes transaction requests transmitted by the bus masters; and a bus controller coupled between the processor bus and the computer bus, and further coupled to the plurality of bus masters by the computer bus and coupled to the target device, the bus controller including logic that receives from a first one of the bus masters a first transaction request for access to the target device, determines whether the target device is available for executing the first transaction request, if the target device is not available, then transmits to the first bus master a retry command that causes the first bus master to re-submit the first transaction request for access to the target device, and prevents any new transaction requests for access to the target device from being executed until the first transaction request re-submitted by the first bus master is received, the bus controller further including a bus arbiter and a bus interface coupled to the bus arbiter, the bus arbiter being structured to transmit to the bus interface an identification of the first bus master in response to receiving from the first bus master a request for access to the computer bus, the bus interface structured to use the identification to transmit the retry command to the first bus master if the target device is not available for executing the first transaction request and to store, for each of the bus masters other than the first bus master, a retry indicator in response to transmitting a retry command to the first bus master, the retry indicator causing the bus interface to transmit retry commands to all of the bus masters, other than the first bus master, if the bus masters transmit transaction requests to the bus interface before the first transaction request is re-submitted by the first bus master.

15. The computer system of claim 14 wherein the target device is a random access memory device that stores data.

16. The computer system of claim 14 wherein the bus controller includes a bus interface and a buffer associated with the target device, the bus interface determining whether the target device is available to execute the first transaction request by determining whether the buffer is in a state that enables execution of the first transaction request.

17. The computer system of claim 16 wherein the buffer is a write buffer, the first transaction request is a write transaction request, the write buffer is in a state that enables execution of the write transaction request if the write buffer is not full, and, if the write buffer is full, the bus controller transmits the retry command to the first bus master and prevents any transaction requests for access to the target device from being executed until the write transaction request re-submitted by the first bus master is received.

18. The computer system of claim 16 wherein the buffer is a write buffer, the first transaction request is a read transaction request, the write buffer is in a state that enables execution of the write transaction request if the write buffer is empty, and, if the write buffer is not empty, the bus controller transmits the retry command to the first bus master and prevents any transaction requests for access to the target device from being executed until the read transaction request re-submitted by the first bus master is received.

19. The computer system of claim 14 wherein the target device is a memory device and the bus controller includes a bus interface and a memory interface coupled to the bus interface, the bus interface receiving the first transaction request from the first bus master via the computer bus, determining whether the memory device is available for executing the first transaction request, transmitting the retry command to the first bus master if the memory device is unavailable, and, if the memory device is available, transmitting the first transaction request to the memory via the memory interface.

20. The computer system of claim 14 wherein the computer bus comprises a bus that is specifically designed to support a retry signal.

21. The computer system of claim 14 wherein the computer bus comprises an expansion bus and the plurality of bus masters comprises a plurality of expansion computer devices.

22. A computer system having a processor that avoids a livelock condition, the computer system comprising:

a processor bus coupled to the processor;

a computer bus;

a plurality of bus masters coupled to the computer bus, each of the bus masters including a bus interface that transmits transaction requests on the computer bus;

a target device that receives and executes transaction requests transmitted by the bus masters; and a bus controller coupled between the processor bus and the computer bus, and further coupled to the plurality of bus masters by the computer bus and coupled to the target device, the bus controller including logic that receives from a first one of the bus masters a first transaction request for access to the target device, determines whether the target device is available for executing the first transaction request, if the target device is not available, then transmits to the first bus master a retry command that causes the first bus master to re-submit the first transaction request for access to the target device, and prevents any new transaction requests for access to the target device from being executed until the first transaction request re-submitted by the first bus master is received, the bus controller further including a bus arbiter and a bus interface coupled to the bus arbiter, the bus arbiter being structured to transmit to the bus interface an identification of the first bus master in response to receiving from the first bus master a request for access to the computer bus, the bus interface structured to use the identification to transmit the retry command to the first bus master if the target device is not available for executing the first transaction request and to transmit to the bus arbiter a retry signal indicating that each of the bus masters other than the first bus master should be denied access to the computer bus until the first transaction request is re-submitted by the first bus master and the bus arbiter is structure to store, for each of the bus masters other than the first bus master, an arbitration indicator that prevents the bus arbiter from granting any of the bus masters, other than the first bus master, access to the computer bus before the first transaction request is re-submitted by the first bus master.

23. A bus controller that avoids a livelock condition in a computer bus coupling the bus controller to a plurality of bus masters, the bus controller also being coupled to a target device, the bus controller comprising:

a processor interface coupled to a processor bus to control data flow between the bus controller and the processor bus;

a target interface coupled to the target device to control data flow between the bus controller and the target device;

a bus arbiter that receives from a first one of the bus masters a first request for access to the computer bus and transmits an identification of the first bus master in response to receiving from the first bus master a request for access to the computer bus; and a bus interface coupled to the bus arbiter to receive the identification of the first bus master and structured to receive from the first bus master a first transaction request for access to the target device, determine whether a path to the target device is available for executing the first transaction request, transmit to the first bus master a retry command if the path to the target device is not available to execute the first transaction request, and prevent any transaction requests for access to the target device from being executed until the first transaction request is re-submitted by the first bus master and received by the bus interface, the bus interface further structured to use the identification to transmit the retry command to the first bus master if the target device is not available for executing the first transaction request and to store, for each of the bus masters other than the first bus master, a retry indicator in response to transmitting a retry command to the first bus master, the retry indicator causing the bus interface to transmit retry commands to all of the bus masters, other than the first bus master, if the bus masters transmit transaction requests to the bus interface before the first transaction request is re-submitted by the first bus master.

24. The bus controller of claim 23, further comprising:

a write buffer that temporarily stores write transaction requests directed to the target device, wherein the bus interface is structured to determine whether the write buffer is full if the first transaction request is a write transaction request, the path to the target device being unavailable to execute the write transaction request if the write buffer is full.

25. The bus controller of claim 23, further comprising:

a write buffer that temporarily stores write transaction requests directed to the target device, wherein the bus interface is structured to determine whether the write buffer is empty if the first transaction request is a read transaction request, the path to the target device being unavailable to execute the read transaction request if the write buffer is not empty.

26. The bus controller of claim 13 wherein the bus arbiter is further coupled to each of the bus masters through a dedicated arbitration request line and a dedicated arbitration grant line.

27. A method of avoiding a livelock condition among a plurality of bus masters coupled to an expansion bus, the method comprising:

determining whether a transaction requested by a requesting bus master coupled to the expansion bus can be completed;

sending a retry command to the requesting bus master in response to determining the requested transaction cannot be completed;

storing an ineligible flag for each of the remaining bus masters which indicates that access to the expansion bus should be denied;

denying any remaining bus masters coupled to the expansion bus access to the expansion bus until the transaction requested by the requesting bus master is completed; and clearing the ineligible flag for each of the remaining bus masters in response to completing the requested transaction.

28. The method of claim 27 wherein denying access comprises refraining from sending a grant signal on a dedicated grant line to any of the remaining bus masters transmitting a request signal.

* * * * *

UNITED STATES PATENT AND TRADEMARK OFFICE
CERTIFICATE OF CORRECTION

PATENT NO.   : 6,141,715                                               Page 1 of 1
DATED        : October 31, 2000
INVENTOR(S)  : A. Kent Porterfield It is certified that error appears in the above-identified patent and that said Letters Patent is hereby corrected as shown below:

Title page,
Title "METHOD AND SYSTEM FOR AVOIDING LIVE LOCK CONDITIONS ON A COMPUTER BUS BY INSURING THAT THE FIRST RETIRED BUS MASTER IS THE FIRST TO RESUBMIT ITS RETRIED TRANSACTION" should read
-- METHOD AND SYSTEM FOR AVOIDING LIVELOCK CONDITIONS ON A COMPUTER BUS BY INSURING THAT THE FIRST RETIRED BUS MASTER IS THE FIRST TO RESUBMIT ITS RETRIED TRANSACTION --

Column 10,
Line 45, "bus master, are preventing" should read -- bus master, are prevented --

Column 14,
Line 11, "of claim 13 wherein" should read -- of claim 23 wherein --

Signed and Sealed this

Eighteenth Day of December, 2001

Attest:

Attesting Officer

JAMES E. ROGAN
Director of the United States Patent and Trademark Office